United States Patent [19]

Frobose

[11] 4,235,186
[45] Nov. 25, 1980

[54] OIL LEVEL INDICATOR

[75] Inventor: James W. Frobose, Haskins, Ohio

[73] Assignee: Jasper Corporation, Easton, Md.

[21] Appl. No.: 33,243

[22] Filed: Apr. 25, 1979

[51] Int. Cl.³ .................. G01F 23/04; G01F 23/06
[52] U.S. Cl. ........................... 116/227; 33/126.7 R
[58] Field of Search .............. 116/227; 33/126.7 R,
33/126.4 R, 126.4 A; 285/396; 73/425.4 P,
425.6, 303

[56] References Cited

U.S. PATENT DOCUMENTS

| 3,699,914 | 10/1972 | Smith | 116/227 |
| 3,972,234 | 8/1976 | Osojnak | 73/303 |

FOREIGN PATENT DOCUMENTS 858370 1/1961 United Kingdom .................. 285/396

Primary Examiner—Gerald Goldberg
Assistant Examiner—Denis E. Corr
Attorney, Agent, or Firm—Brady, O'Boyle & Gates

[57] ABSTRACT

An automobile crankcase oil level indicator in ready reach of the vehicle driver has its main components molded from plastics and constructed for ease of assembly and installation. A minimum number of parts are employed to minimize manufacturing costs and to make the device compatible with mass production techniques. A unitized piston, piston rod and piston seal is employed in the device along with a unique simplified coupling between the main cup or housing and the face plate.

3 Claims, 9 Drawing Figures

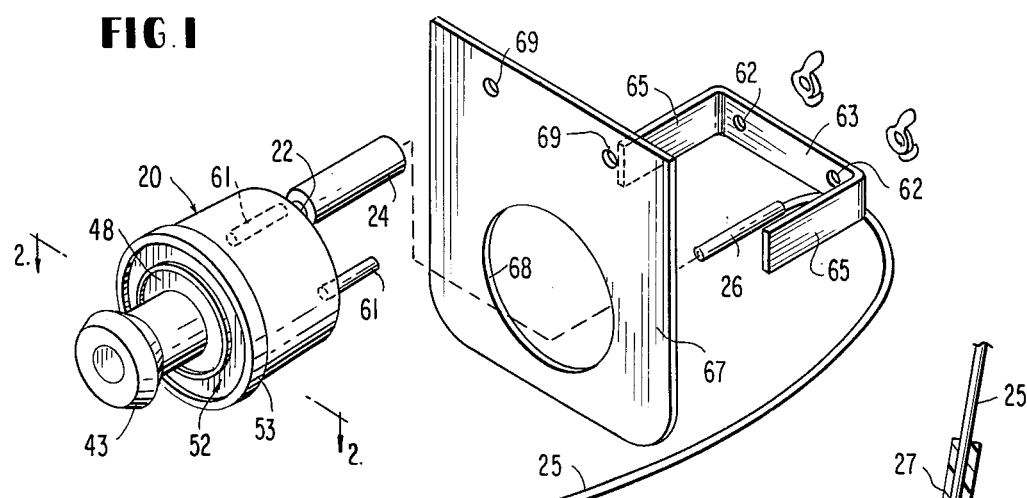
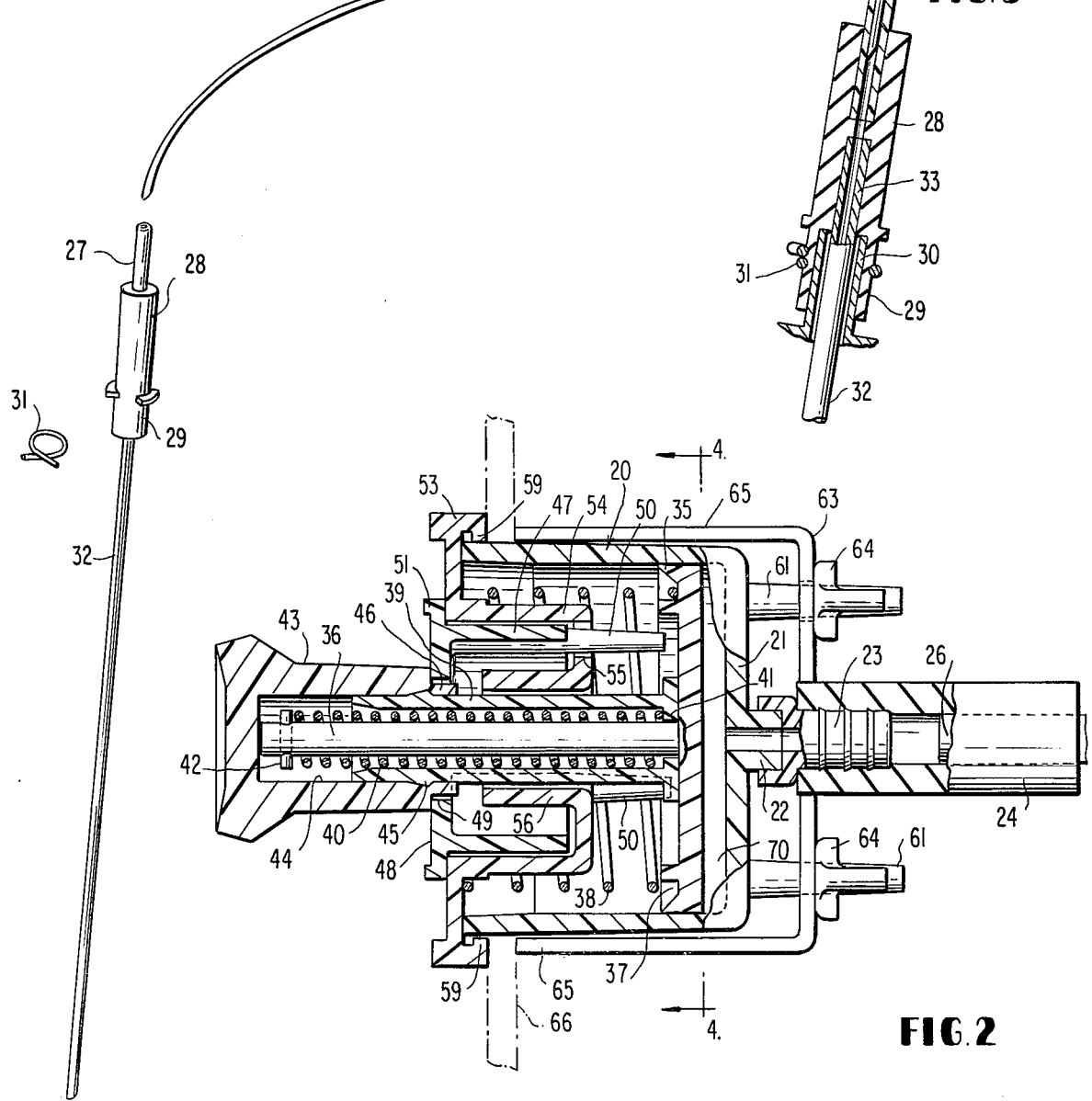

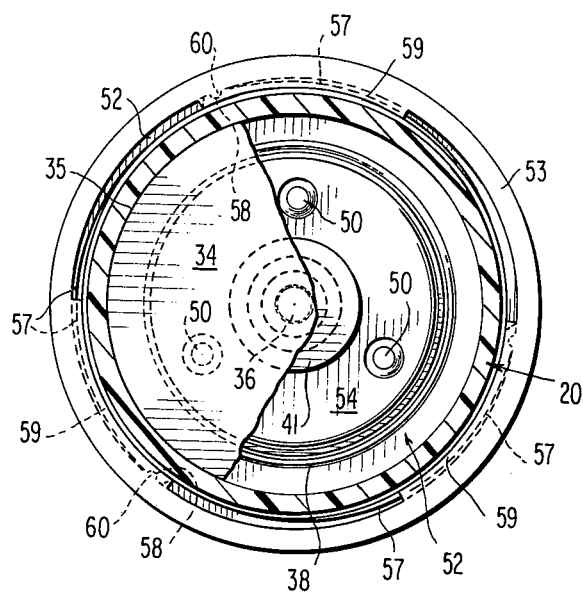
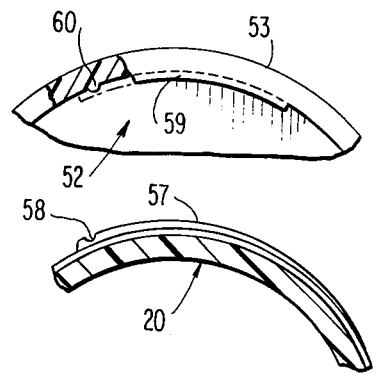
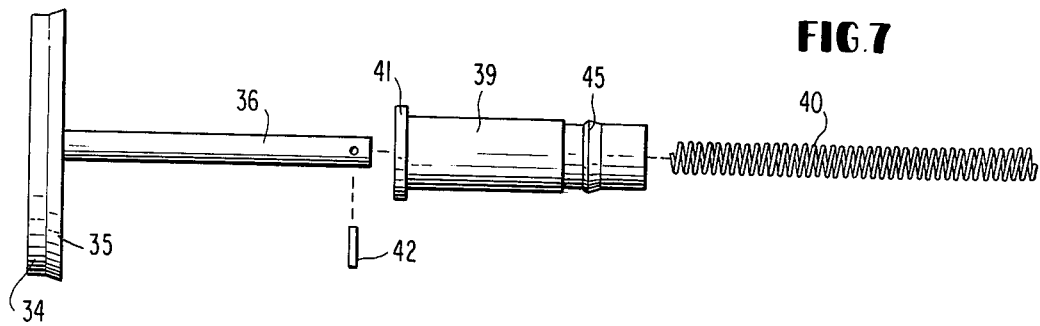
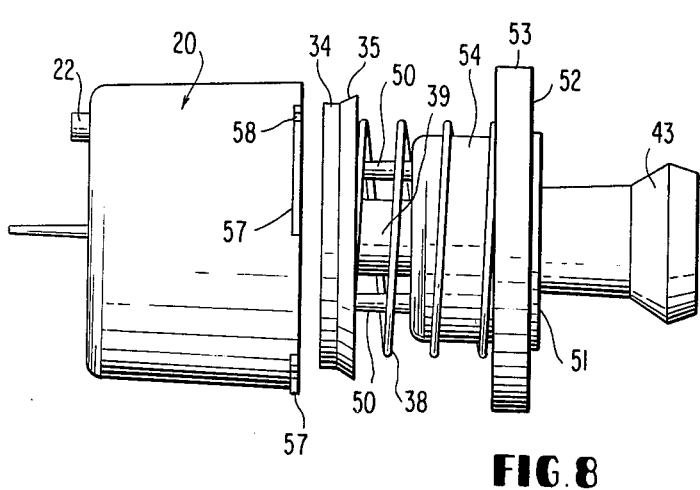
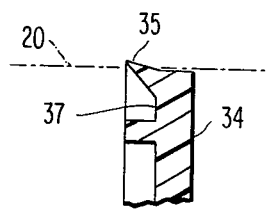

OIL LEVEL INDICATOR

BACKGROUND OF THE INVENTION

The ever-decreasing service available to motorists at gas stations, the proliferation of self-service stations, and the economic advantage of the motorist changing his own oil at proper intervals has created a need for a convenient and economical oil level indicator on the automobile which is reliable and can be operated by the driver or owner of the vehicle at desired times. Such a device dispenses with the necessity for opening the hood of the vehicle and checking the oil level with the traditional dip stick, which can be a messy operation to say the least.

The above need has been recognized in prior U.S. Pat. No. 3,699,914 covering an oil level indicator for vehicles which is mounted on the instrument panel in ready reach of the driver. While functionally adequate, the patented indicator is quite complex in its structure and very impractical to manufacture on a mass production basis. It involves an assembly of metallic and plastic components, some of which require tedious and costly crimping opertions at the time of assembly. An excessive number of individual parts are utilized in the fabrication of the patented indicator and its assembling is tedious.

Accordingly, the primary object of this invention is to improve on the device in the above-noted prior patent by reducing substantially the number of parts, simplifying assembly procedure and costs, and utilizing molded plastics in the formation of all major components of the indicator. In this manner, the indicator according to the present invention is rendered much less costly to manufacture and assemble.

More particularly, it is an object of the invention to unite certain parts which are separately formed in the prior art and to mold these united parts from plastics. In the present device, a vacuum piston, its rod, and a yielding marginal piston seal are united and the piston is further constructed to serve as a seat for a piston return spring.

Another important and unique feature embodied in the present invention is an improved coupling between the bezel or face plate of the indicator and its piston cup or housing. This coupling eliminates the requirement in the prior art for crimping metal parts in assembled relationship with plastic or synthetic parts. Instead, the improved coupling comprises a snap type bayonet coupling between the face plate and piston cup of the indicator which is easy to operate and very secure.

Other features and advantages of the invention will appear during the course of the following detailed description.

BRIEF DESCRIPTION OF THE DRAWINGS

FIG. 1 is an exploded perspective view of an oil level indicator in accordance with the invention.

FIG. 2 is a central longitudinal cross section taken on line 2—2 of FIG. 1.

FIG. 3 is a fragmentary enlarged vertical section taken through the crankcase dip stick receptor tube and associated elements of the invention.

FIG. 4 is a transverse vertical section taken on line 4—4 of FIG. 2.

FIG. 5 is an interior elevational view of a face plate and coupling component, partly in cross section.

FIG. 6 is a fragmentary cross section showing coupling means on a piston cup.

FIG. 7 is an exploded side elevation of a piston, spring and indicator element sub-assembly.

FIG. 8 is an exploded side elevation showing the piston cup or housing and the indicator and face plate assembly.

FIG. 9 is an enlarged fragmentary cross section taken through an integral piston and yielding seal.

DETAILED DESCRIPTION

Referring to the drawings in detail wherein like numerals designate like parts, a crankcase oil level indicator in accordance with the invention comprises a piston cup or housing 20 including an end wall 21 having an offset tubular nipple 22 telescopically coupled to a tube fitting 23, in turn telescopically coupled to a short section of thick walled elastic tubing 24. The cup 20 is molded as a unit from a suitable plastics material. A required length of flexible tubing 25 has one end thereof frictionally telescoped to a short enlarged tubular connector 26 which in turn is frictionally telescoped in the bore of the elastic tubing 24, FIG. 1.

The far end of the flexible tubing 25, FIG. 3, has tight telescopic engagement in the bore of a short substantially rigid plastic coupling tube 27, in turn tightly telescoped into the bore of a rubber-like coupling 28. The coupling 28 includes a forward sleeve extension 29 which telescopes snugly over the usual metal crankcase receptor tube 30 for a conventional dip stick which is removed and set aside when the present invention is utilized. Preferably, a spring wire clamping ring 31 surrounds and tightly grips the elastic sleeve extension 29 to hold the latter in snug engagement with the metal receptor tube 30 rising from the crankcase.

In lieu of the customary dip stick, another tubing section 32 formed of aluminum or the like is carefully cut to the proper length using the removed dip stick as a guide, and the tubing section 32 has its upper terminal 33 tightly telescoped into another bore of the coupling 28 immediately above the sleeve extension 29. The far terminal of tubing section 32 is introduced into the crankcase through the receptor tube 30 and when the coupling 28 is solidly seated on the receptor tube, FIG. 3, the far end of the tubing section 32 will be positioned at the proper level in the engine crankcase to measure the adequacy or inadequacy of the oil level therein.

The previously-described piston cup 20 receives therein a molded plastics piston 34 having an integral marginal tapered resilient seal 35 engaging the bore of cup 20 under sufficient tension to form an effective seal. A central axial piston rod 36 is molded integrally with the piston 34 and in the assembled device, FIG. 2, extends outside of the cup 20 for a considerable distance. The molded piston unit also has formed thereon a seating recess 37 for a piston return spring 38 disposed within the cup 20 of the assembled indicator.

A molded plastics oil level indicator tube 39, preferably green in color at least on its outside surface, is received over piston rod 36 with sufficient clearance to accommodate therebetween a compression spring 40 which has one end bottoming on an end flange 41 of indicator tube 39 and its opposite end engaging a cross pin 42 received in a cross opening in the piston rod 36 near its free end.

A molded plastics operating knob 43 for the oil level indicator has a bore 44 receiving the end portion of piston rod 36, FIG. 2, and the knob 43 has snap locked engagement with the outer end portion of indicator tube 39 through the interengagement of a tapered detent enlargement 45 on the indicator tube and an end locking ring extension 46 on the knob 43. When the knob is snap locked onto the indicator tube 39, the two parts will be held in permanently assembled relationship. By forming the components of the indicator from plastics, it will be appreciated that production costs are minimized, and efficient, convenient and economical assembly techniques unavailable with other materials are made feasible.

A second indicator sleeve 47, namely a warning indicator, preferably colored red at least on its outer surface, includes an outer end wall 48 having a central opening 49 to receive the locking ring extension 46 with suitable clearance. The interior end of indicator sleeve 47 is open. Preferably three spacer legs 50 molded integrally with the plastics material indicator sleeve 47 project inwardly thereof with their tips normally spaced somewhat from the piston 34 in the assembled device, FIG. 2. An outer marginal flange 51 on the indicator sleeve 47 laps the outer flat surface of a molded plastics bezel or face plate 52 having an integral marginal ring flange 53.

The face plate 52 has a central axial cup-like extension 54 projecting inwardly thereof in closely spaced concentric surrounding relationship to the warning indicator sleeve 47. The cup-like extension 54 has clearance holes 55 for the spacer legs 50 formed in its bottom wall. An interior sleeve section 56 rises from the bottom wall of the cup-like extension 54 in spaced surrounding relationship to the indicator tube 39. The entire face plate 52 including extension 54 and sleeve section 56 is an integrally molded unit.

A unique feature of the invention lies in the provision of a simplified and very effective coupling arrangement between the cup 20 and the face plate 52 or bezel. Referring primarily to FIGS. 4 through 6, the exterior of cup or housing 20 has formed thereon at three circumferentially equidistantly spaced regions at the mouth of the cup circumferentially inclined ramps 57, each ramp having an exterior groove 58 formed therethrough near its end of maximum thickness. Similarly, the ring flange 53 of face plate 52 is provided at three regions with radially inwardly projecting lips 59 having circumferential lengths similar to the lengths of the ramps 57. The interior surface of ring flange 53 is provided near one end of each lip 59 with an inwardly projecting detent element 60 integrally molded thereon, as shown in FIG. 5. When face plate 52 is to be coupled with the cup 20, the parts are positioned so that the lips 59 are at the circumferential regions on the exterior of the cup 20 between the ramps 57. This allows the face plate 52 to be positioned against the outer end face of the cup 20, as shown in FIG. 2. Following this, the face plate is turned circumferentially on the cup 20 causing the projecting detents 60 to ride up on the inclined surfaces of the ramps 57 and to snap into the locking grooves 58 thereof. At this time, the projecting lips 59 on the ring flange 53 will also be locked beneath the three ramps 57 and the face plate is firmly and permanently coupled in assembled relationship with the cup 20. The arrangement forms a snap-type bayonet coupling between the two components. Since the components are molded from plastics, all of the coacting coupling elements 57, 59 and 60 are integrally molded on the parts and the simple assembly mode is greatly facilitated and is made economically practical.

A pair of diametrically spaced mounting studs 61 of tapered formation are integrally molded on the end wall 21 of cup 22. These studs project through apertures 62 of a mounting U-bracket 63 and receive wing nuts 64 thereon, the studs being self-threading as they accept the nuts. The two side arms 65 of bracket 63 bear against the inner face of a vehicle instrument panel 66 as shown in FIG. 2, the ring flange 53 of face plate 52 engaging the outer face of the instrument panel clampingly as the nuts 64 are tightened up. The instrument panel of course has a suitable opening to receive cup 20 therethrough. In case the instrument panel is not designed to accommodate tha oil level indicator in the manner shown in FIG. 2, a separate mounting plate 67, FIG. 1, for it may be provided, having an opening 68 to receive the cup 20 and spaced apertures 69 by means of which the mounting plate 67 can be suspended from a suitable structural member in the vehicle.

In use, when there is an adequate oil level in the crankcase, the lower end of tubing 32 will be covered by oil. When the user of the oil level indicator pulls axially on the knob 43, the piston 34 will be locked against outward displacement in the cup 20 by vacuum in the space 70 between the piston and end wall 21. However, the knob 43 being locked to the green colored indicator tube 39 causes this tube to compress the spring 40 and move outwardly until the end flange 41 abuts the end wall of cup-like extension 54. At this point, a substantial portion of the green colored indicator tube 39 is exposed to view outwardly of the face plate 52 and the green color will indicate to the user that the oil level is safe and no oil needs to be added to the crankcase at that time.

In case the oil level is low to a point requiring the addition of oil to the crankcase, the lower end of tubing 32 will be uncovered. When the user of the device pulls on the knob 43, the piston 34 will be free to move outwardly in the cup 20, as there is no vacuum in the space 70 holding or locking it. Therefore, the piston 34 will be displaced outwardly by a lesser force than is required to compress the spring 40 and when the piston 34 moves, it will engage the projecting legs 50 of the red colored warning indicator sleeve 47 and force this element to travel outwardly with the knob 43 and the green indicator sleeve 39 which will remain covered and concealed from view. Such outward movement of the parts 34, 36, 39, 43 and 47 against the force of return spring 38 will expose to view outwardly of the face plate 52 a substantial portion of the red warning indicator sleeve 47 alerting the operator to the need for adding oil to the crankcase. Upon release of the knob 43, the spring 38 will return the parts to their relative positions shown in FIG. 2 where the flange 51 abuts the face plate 52. Similarly, when there is vacuum in the space 70 and only the knob 43 and green indicator tube 39 can move outwardly, as previously described, upon release of the knob 43, the spring 40 will return the indicator tube 39 to its position shown in FIG. 2 where the end flange 41 is abutting the piston 34.

The construction of the device is highly simplified and economical due to the major components being formed entirely of molded plastics, as previously explained. The device is ideally suited for mass production and ease of assembly, as well as convenience of use. The advantages of the invention over the prior art should now be readily apparent to those skilled in the art without the necessity for any further description herein.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. An oil level indicator comprising a tube element adapted to be positioned in a crankcase with an open end of the tube element at a predetermined level therein, an indicator assembly coupled with the tube element remotely from the crankcase, and mounting means for the indicator assembly, the improvement comprising a cup formed of molded plastics, a molded plastics face plate covering the open end of the cup, a snap action bayonet coupling means molded integrally on the face plate and cup to cooperatively hold the face plate and cup in assembled relationship, said coupling means comprising circumferentially spaced and circumferentially tapered ramp elements on the exterior of said cup adjacent the mouth of the cup and being molded integrally with the cup, each ramp element having a detent groove near one end thereof, said face plate having a marginal ring flange overlapping the exterior of the cup adjacent to the mouth of the cup, circumferentially spaced radially inwardly projecting lips on said ring flange integrally molded therewith in close surrounding relationship to the exterior of the cup and spaced from the mouth of the cup by a distance substantially the same as the thickness of said ramp elements axially of the cup whereby said lips are engageable lockingly below the ramp elements, protruding detent elements integrally molded on the interior of said ring flange between said lips and the mouth of the cup and being positioned to ride on the exterior faces of the tapered ramp elements and to snap lockingly into said grooves of the ramp elements, a piston, piston rod and marginal piston seal unit engageable movably within the cup, there being a space within the cup between the cup end wall and said piston in communication with said tube element, a return spring for said unit interposed between the piston of said unit and said face plate, a safe oil level indicator tube in surrounding relationship to the piston rod of said unit and having an end wall adapted to bear on said piston, a compression spring within the bore of the safe oil level indicator tube and being captive between said end wall and an abutment element on said piston rod spaced from said end wall, a knob having snap locked assembled engagement with said safe oil level indicator tube outside of said cup, and a low oil level indicator sleeve surrounding the safe oil level indicator tube and movable axially relative thereto in response to displacement of said unit by said knob when there is no vacuum in said space.

2. An oil level indicator as defined in claim 1, and said snap locked assembled engagement of said knob with said safe oil level indicator tube comprising a tapered external enlargement on said indicator tube, said knob being of molded plastics, and a cooperative yielding locking ring extension on said knob molded integrally therewith and adapted to ride over said enlargement and snap into locking position behind the enlargement with an end portion of the indicator tube telescoped within a bore of said knob, said enlargement being integrally molded on said indicator tube.

3. An oil level indicator as defined in claim 1, and said piston, piston rod and marginal piston seal unit being an integral molded plastics unit, said marginal piston seal of said unit comprising a tapered annular seal rising from one face of said piston and molded integrally therewith and having a knife-like edge which projects somewhat radially outwardly of the body of the piston when in a relaxed state and adapted to exert a strong wiping action on the bore of said cup when engaged in said bore.

* * * * *